United States Patent
Jönsson et al.

(10) Patent No.: US 9,407,495 B2
(45) Date of Patent: Aug. 2, 2016

(54) COMBINING LOCALLY ADDRESSED DEVICES AND WIDE AREA NETWORK (WAN) ADDRESSED DEVICES ON A SINGLE NETWORK

(75) Inventors: Ulf Fredrik Jönsson, Sollentuna (SE); Henrik Basilier, Täby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1588 days.

(21) Appl. No.: 12/865,918

(22) PCT Filed: Feb. 5, 2008

(86) PCT No.: PCT/IB2008/000256
§ 371 (c)(1),
(2), (4) Date: Aug. 3, 2010

(87) PCT Pub. No.: WO2009/098530
PCT Pub. Date: Aug. 13, 2009

(65) Prior Publication Data
US 2010/0332626 A1   Dec. 30, 2010

(51) Int. Cl.
| | | |
|---|---|---|
| G06F 15/177 | (2006.01) | |
| G06F 15/16 | (2006.01) | |
| G06F 13/38 | (2006.01) | |
| H04L 29/12 | (2006.01) | |
| H04L 12/701 | (2013.01) | |

(52) U.S. Cl.
CPC ............ *H04L 29/1282* (2013.01); *H04L 45/00* (2013.01); *H04L 61/2015* (2013.01); *H04L 61/6013* (2013.01)

(58) Field of Classification Search
CPC .. H04L 45/74; H04L 61/2007; H04L 61/2015
USPC ......................................................... 709/220
See application file for complete search history.

(56) References Cited

U.S. PATENT DOCUMENTS 7,783,800 B2 *   8/2010   Staats et al. ..................... 710/64
7,937,494 B2 *   5/2011   Droms et al. .................. 709/245

FOREIGN PATENT DOCUMENTS

| EP | 1613022 A | 1/2006 | |
|---|---|---|---|
| EP | 1613022 A1 * | 1/2006 | ............. H04L 29/12 |
| EP | 1892883 A | 2/2008 | |

* cited by examiner

*Primary Examiner* — Phuoc Nguyen
*Assistant Examiner* — Kishin G Belani

(57) ABSTRACT

Systems and methods according to these exemplary embodiments provide for methods and systems for allowing a variety of devices desiring Internet Protocol (IP) addresses from potentially different locations to all operate on the same local area network. For example, a node, e.g., a gateway device, can receive a request for an IP address and determine whether that request was issued by a locally addressable device or a wide area network (WAN) addressable device. The node can then selectively locally provide an IP address or request an IP address, e.g., from a WAN, based on the determination.

16 Claims, 7 Drawing Sheets

COMBINING LOCALLY ADDRESSED DEVICES AND WIDE AREA NETWORK (WAN) ADDRESSED DEVICES ON A SINGLE NETWORK

TECHNICAL FIELD

The present invention relates generally to telecommunications systems and in particular to methods and systems for allowing a variety of devices desiring IP addresses from potentially different sources to operate, e.g., on the same local area network.

BACKGROUND

Communications technologies and uses have greatly changed over the last few decades. In the fairly recent past, copper wire technologies were the primary mechanism used for transmitting voice communications over long distances. As computers were introduced the desire to exchange data between remote sites grew for many purposes, such as those of businesses, individual users and educational institutions. The introduction of cable television provided additional options for increasing communications and data delivery from businesses to the public. As technology continued to move forward, digital subscriber line (DSL) transmission equipment was introduced which allowed for faster data transmissions over the existing copper phone wire infrastructure. Additionally, two way exchanges of information over the cable infrastructure became available to businesses and the public. These advances have promoted growth in service options available for use, which in turn increases the need to continue to improve the available bandwidth for delivering these services, particularly as the quality of video and overall amount of content available for delivery increases.

As the consumer electronics industry continues to mature, and the capabilities of processors increase, more devices have become available for public use that allow for the transfer of data between devices and more applications have become available that operate based on this transferred data. Of particular note are the Internet and local area networks (LANs). These two innovations allow multiple users and multiple devices to communicate and exchange data between different devices and device types. With the advent of these devices and capabilities, users increasingly desire to receive a variety of services over these networks. Some common examples of these services (or applications) are video on demand (VoD), Internet Protocol television (IPTV) and audio files. Additionally, many of these services can be received in different formats, relating to different service quality levels, based upon a variety of parameters.

Taking advantage of the ongoing improvements to communications, a single user or users within a household can have various devices that are capable of interacting with other devices and/or systems through various networks. It is not uncommon for a household to have personal computers (PCs) 10 and 12, a cell phone 14 and a personal digital assistant (PDA) 16 all of which are capable of connecting to a wide area network (WAN) 22 through different interfaces as shown in FIG. 1. In this example, PCs 10 and 12 are part of a home local area network (LAN) and are connected to a network access translation (NAT) router 18 which is part of customer premise equipment (CPE) gateway (GW) 20, for example, a digital subscriber line (DSL) modem or a cable modem. The NAT router 18 (or similar device using network access port translation (NAPT)) receives a single WAN IP address which is shared by all of the devices associated with the NAT router's 18 LAN. To differentiate between devices in its LAN a typical NAT router 18 uses Address Resolution Protocol (ARP) to obtain the Medium Access Control (MAC) addresses (given the locally assigned IP addresses from reserved private IP addresses, e.g., 192.168.x.x) of the devices, e.g., PCs 10 and 12 which are then stored. Packets can then be transmitted by these locally addressed devices, e.g., PCs 10 and 12, by using ARP and layer 2 switching. This layer 2 switch could be located in CPE GW 20 or elsewhere in the network. This then allows the CPE GW 20 with router 18 to provide access for the devices to a WAN 22 by forwarding traffic to IP edge node 26 associated with WAN 22. When local traffic is outgoing to the WAN 22, the packets pass through the NAPT function in the router 18 wherein the local address is replaced by a WAN address in the IP source address field. In the opposite direction traffic from IP edge node 26 is received by CPE GW 20. The received traffic then goes through the NAPT function within router 18 where the WAN address is replaced by the local address in the IP destination address field. The router 18 within CPE GW 20 knows that this traffic address belongs to the local subnet, i.e., from the matching prefix, and that this local subnet is a LAN of an Ethernet type. The ARP protocol can then be used to find the Ethernet MAC address of the device (alternatively the Ethernet MAC address of the device associated with the incoming traffic can be stored from the initial use of the ARP protocol). For more information regarding ARP, the interested reader is referred to RFC 826 and RFC 4338 which can be found online at www.ietf.org. The received traffic is then forwarded to the MAC address. From here traffic from the PCs 10 and 12, after the desired authentication and approval process, goes to and can be received from their desired respective correspondent nodes (not shown).

Also as shown in FIG. 1, other household devices can be in communication with correspondent nodes (not shown) associated with WAN 22. For example, cell phone 14 and PDA 16 can have a wireless connection to cellular network 24 which represents any of the different types of cellular networks and the infrastructure used to connect the cellular network 24 with WAN 22, which in turn is in communication with an IP edge node 28 associated with the WAN 22. At this point, traffic from cell phone 14 and PDA 16, after the desired authentication and approval process, goes to their desired respective correspondent nodes (not shown). These devices, cell phone 14 and PDA 16, are considered to be WAN addressed devices since they are directly assigned their own WAN IP address, e.g., cell phone 14 can be assigned a WAN IP address of, for example, 178.12.13.15 from a source associated with WAN 22, e.g., a dynamic host configuration protocol (DHCP) server. These WAN addressed devices do not share their IP address with any other devices, i.e., a single unique IP address is associated with each WAN addressed device. Typically WAN addressed devices desire their own IP address from a WAN due to being mobile and/or the device or service desired requires a type of special service or policies that are difficult to support when "hidden" behind a NAT router. Since FIG. 1 is showing a simplified communications diagram, it is to be understood that there typically would be a plurality of routers (not shown) within WAN 22 through which communications between these devices and their respective correspondent nodes (not shown) travel. This concept also can apply to the travel path for mobile communications enroute to an IP edge node 28 from their respective originating points.

As shown in FIG. 1, not all of the communication devices are operating within the same LAN at the user's household. This means that the locally addressed devices, e.g., PC 10 and PC 12, are not locally communicating directly with the WAN addressed devices, e.g., cell phone 14 and wireless PDA 16. It would be useful to have the option to connect the WAN addressed devices to the LAN and allow these WAN addressed devices to communicate directly with other devices connected to that LAN, as well as reducing the load on the wireless access system.

However, there are currently reasons for not assigning local addresses to WAN addressable devices. For example, for some devices, typically non-stationary devices, it is not desirable to have them operating in a locally addressed mode because a user often wants a device to be reachable from the WAN side to continue to receive all of the same services currently receivable, e.g., cell phone 14 needs its WAN address to typically receive all of their subscribed services from the cellular network 24. Also, if one were able to force all of the devices to have a unique WAN address, the desired number of IP addresses might not be available since there is a cap on the number of available addresses in IPv4. Additionally, there are currently hurdles for putting both locally addressable devices and WAN addressable devices into the same LAN, for example, most CPE GWs 20 available today are designed to operate in either a locally addressable mode for all connected devices or in a WAN addressable mode for all connected devices. When attempting to put both locally addressed devices and WAN addressed devices into the same LAN there need to be methods for the CPE GW 20 to determine when it should allocate IP addresses, when the accessed WAN 22 should allocated IP addresses to devices as well as how to route packets between devices that are locally addressable and those devices that are WAN addressable.

Accordingly the exemplary embodiments described herein provide systems and methods for allowing locally addressed devices and WAN addressed devices to be part of the same LAN for improving communications between these devices.

SUMMARY

Systems and methods according to the present invention address this need and others by providing systems and methods for allowing locally addressed devices and WAN addressed devices to be part of the same LAN, and provide for local communications therebetween, in order to improve communications between these devices.

According to exemplary embodiments, a method for allowing both network devices desiring a local address and network devices desiring a wide area network (WAN) address to obtain Internet Protocol (IP) addresses via a local area network (LAN) includes: receiving a message from an end user device connected to the LAN wherein the end user device is requesting an IP address; determining whether the end user device is a locally addressable device or a WAN addressable device; forwarding the IP address request toward a WAN if the end user device is the WAN addressable device; storing, as route entry information, a returned IP address for the WAN addressable device; and routing information locally over the LAN which is addressed to the WAN addressable device using the stored route entry information.

According to another exemplary embodiment, a communications node includes: a router for receiving a message requesting an IP address; a dynamic host configuration protocol (DHCP) decision function for determining, at least in part, whether the request is associated with a locally addressable device or a WAN addressable device; a network access translation (NAT) function for allocating IP addresses locally for requests associated with the locally addressable device; and a communications interface for forwarding IP address requests associated with the WAN addressable device.

According to another exemplary embodiment, a method for allowing both network devices desiring a local address and network devices desiring a wide area network (WAN) address to obtain Internet Protocol (IP) addresses via a local area network (LAN) includes: receiving a message from an end user device requesting an IP address; determining whether the at least one end user device is a locally addressable device or a WAN addressable device; and selectively either allocating IP addresses locally if the end user device is the locally addressable device or forwarding an IP address request if the end user device is the WAN addressable device.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

As mentioned above, it is desirable to provide mechanisms and methods that allow, for example, operating devices that are locally addressable and wide area network (WAN) addressable devices into a single local area network (LAN) for use at a single access point which provides access to a WAN. In order to provide context for this discussion, an exemplary grouping of devices and communication links will now be described with respect to FIG. 2.

Figure 1:
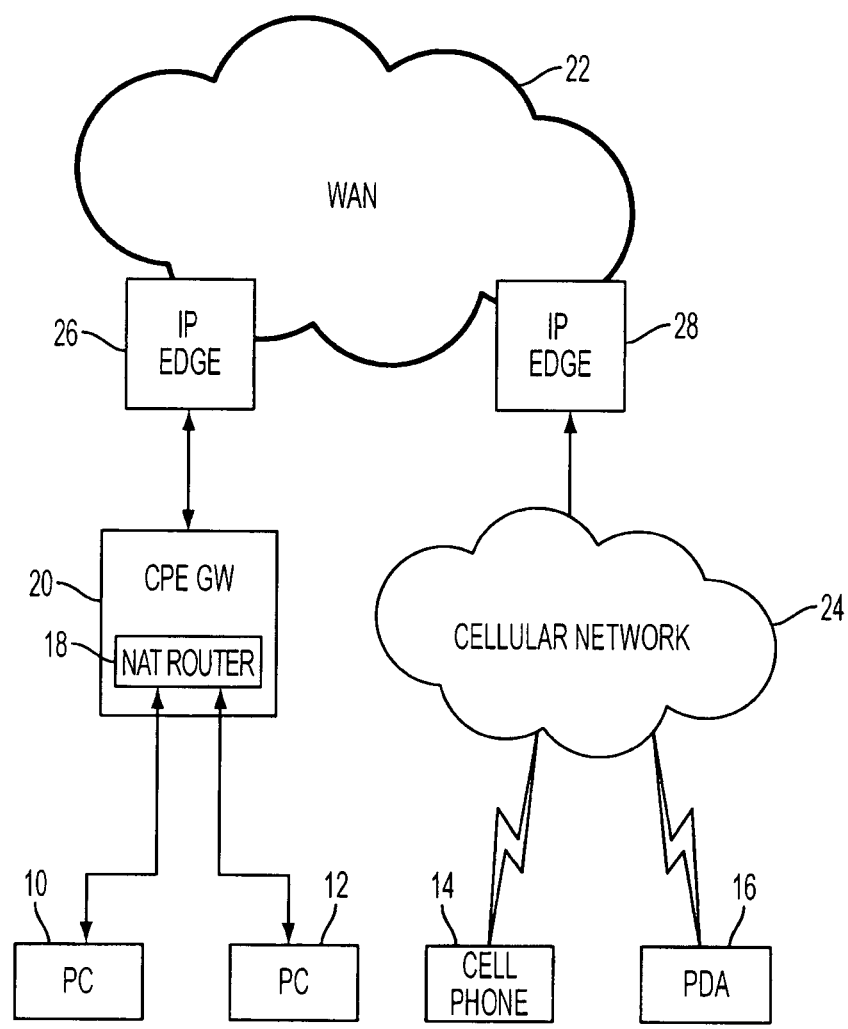
FIG. 1 depicts connection paths for devices to a wide area network.
Figure 2:
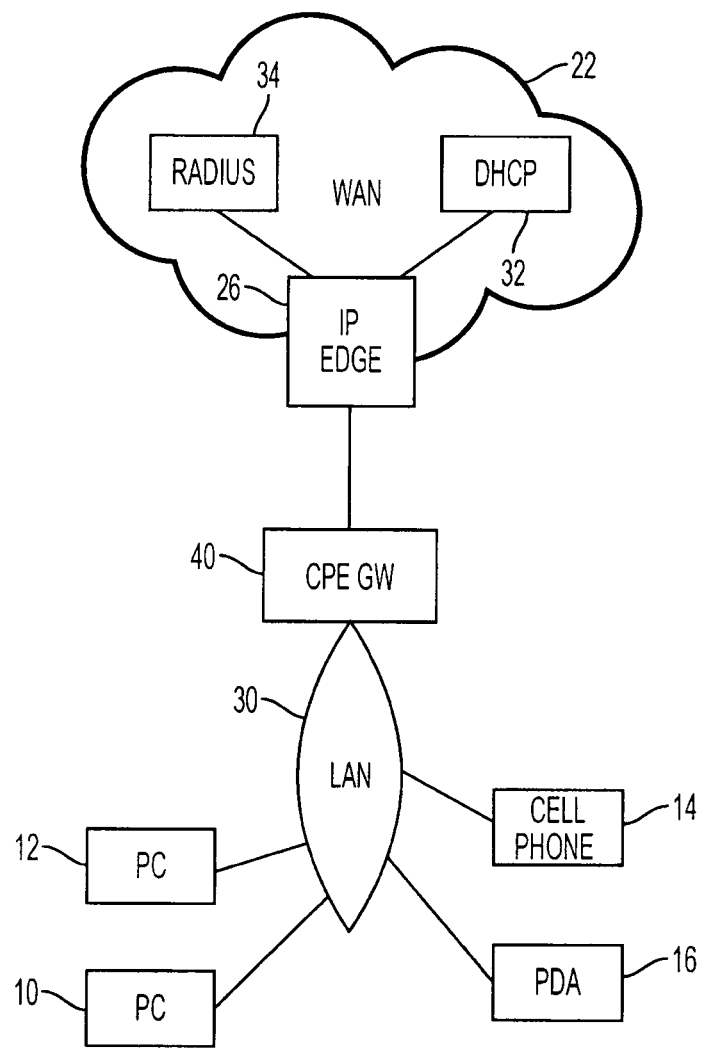
FIG. 2 illustrates a connection path for devices through a gateway to a wide area network according to exemplary embodiments.

According to exemplary embodiments as shown in FIG. 2, the customer premise equipment gateway (CPE GW) 40 is the access point from an end user's residence to a WAN 22. CPE GW 40 includes a network access translation (NAT) (or network access port translation (NAPT)) ability as described above. Additionally, CPE GW 40 is capable of not using NAT on communications as desired. On the residence side, CPE GW 40 is connected to LAN 30. LAN 30 is in communications with locally addressed devices, e.g., personal computers (PCs) 10 and 12 capable of having local Internet Protocol (IP) addresses assigned, and WAN addressed devices, e.g., cell phone 14 and personal digital assistant (PDA) 16. Traffic such as IP packets can be tunneled from these devices over the LAN 30 to the CPE GW 40 for forwarding outside of the residence to a variety of correspondent nodes (not shown) either through or associated with WAN 22. Communications leave CPE GW 40 and are transmitted to IP Edge node 26 which is typically some type of router. IP Edge node 26 can act as an entrance or boundary to WAN 22. Additionally, IP Edge node 26 can be in communications with a dynamic host configuration protocol (DHCP) server 32 and a Remote Authentication Dial In User Service (RADIUS) server 34. The DHCP server 32 can be used when attempting to obtain Internet Protocol (IP) addresses and the RADIUS server 34 can be used for authentication purposes prior to allowing a user device to obtain an IP address or access to specific services. The CPE GW 40, according to exemplary embodiments, is designed to allow both WAN addressed devices and locally addressed devices to communicate with each other in a single LAN 30 and will be described in more detail below.

As described above with respect to FIG. 2, the CPE GW 40 is the access point from a single location, e.g., an end user's residence, to a WAN 22. According to these exemplary embodiments, CPE GW 40 provides a number of useful features for allowing locally addressed devices and WAN addressed devices to operate together on LAN 30 and communicate through CPE GW 40 which will now be described in more detail with respect to FIG. 3. According to exemplary embodiments, CPE GW 40 includes a communications interface 308, a NAT function 306, a DHCP decision function 304 and a router 302. Each of these components can exchange information as needed. Router 302 includes a route entry table 310 for storing IP addresses associated with each device in the LAN 30 and is in communication with both locally addressed devices and WAN addressed devices over LAN 30. DHCP decision function 304 is used in conjunction with the router 302 to determine if a particular device requesting an IP address via LAN 30 needs a WAN IP address or a local address provided by the NAT function 306. NAT function 306 is used for providing local IP addresses. Communications interface 308 is the receiving/forwarding port for communications from/to the WAN 22 through an IP edge node 26. These exemplary components are used to allow locally addressed devices and WAN addressed devices to operate together on LAN 30 and to communicate through CPE GW 40. Exemplary methods for such operations and communications will be described below.

According to exemplary embodiments, both locally addressed devices and WAN addressed devices operate with the same LAN 30 while maintaining local LAN 30 connectivity. For this to occur, CPE GW 40 is capable of, for example, distinguishing between different DHCP sessions. This CPE GW 40 forwards DHCP session requests to the WAN 22 for WAN addressed devices, e.g., cell phone 14, and handles other DHCP session requests locally for locally addressed devices, e.g., PC 10, by allocating private IP addresses. The CPE GW 40 therefore also includes a router 302 which includes a route entry table 310. The route entry table 310 can, for example, be populated with WAN assigned addresses snooped from DHCP signaling messages between the WAN addressed devices on the LAN 30 side and the DHCP server 32 on the WAN 22 side. Once IP addresses are stored in the route entry table 310, local traffic, e.g., IP packets transmitted from a device connected to the LAN 30 toward a WAN addressable device connected to the same LAN 30, can be handled as local traffic and routed as needed, e.g., without the traffic first going out to the WAN 22 and then returning to LAN 30.

Figure 3:
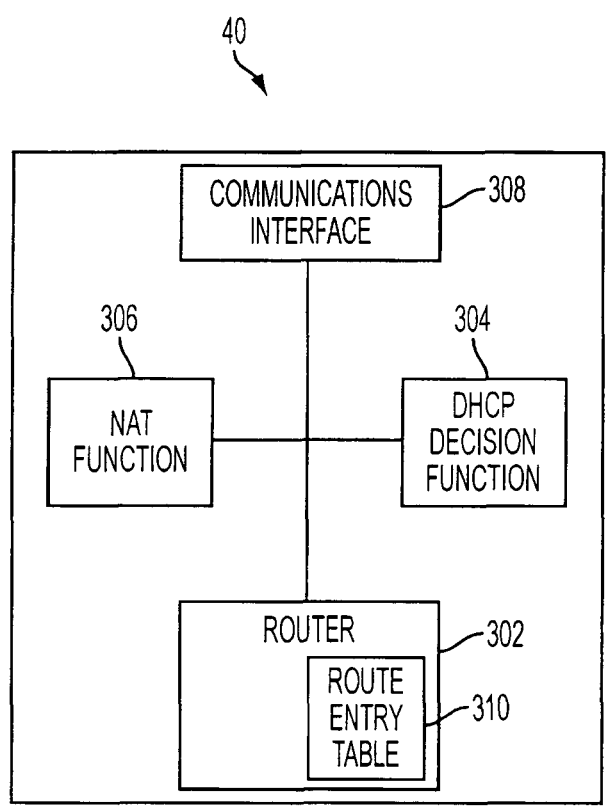
FIG. 3 illustrates a customer premise equipment gateway (CPE GW) according to exemplary embodiments.

Using the exemplary devices described in FIGS. 2 and 3, exemplary systems and methods for implementing a LAN 30 which includes both locally addressable device and WAN addressable devices connecting to a WAN 22 through a CPE GW 40 will now be described. Initially all end user devices, e.g., PCs 10, 12, cell phone 14 and PDA 16, connect using the same LAN 30. Communications can be wired or wireless between these devices and the CPE GW 40. As the locally addressed devices, e.g., PCs 10 and 12, connect to the LAN 30 by communicating with the CPE GW 40, the devices 10 and 12 are determined to be locally addressed devices and are assigned local IP addresses, e.g., 192.168.x.x, by NAT function 306. Additionally, using the Address Resolution Protocol (ARP) Media Access Control (MAC) addresses for the locally addressed devices are determined (as described above in the Background Section) and used by the CPE GW 40 to route IP packets to locally addressable devices connected to the LAN via layer 2 switching. On the other hand, as WAN addressable devices connect to the LAN 30, the devices are determined to be WAN addressable devices. Their IP address requests are forwarded on to, e.g., an associated DHCP server or the like for IP address assignment. The CPE GW 40 stores the returned IP address in the route entry table 310 and uses that address to route local traffic addressed to such WAN addressable devices via layer 3 switching. This determination, i.e., as to whether a connecting device is a locally addressable device or a WAN addressable device, is, for example, performed by the router 302 section of the CPE GW 40 in conjunction with the DHCP decision function 304. One exemplary method for determining if received traffic from the LAN 30 side needs to go through NAT function 306, would be to look at the source address. If the source address is on the local subnet, the router 302 could forward the traffic to NAT function 306, otherwise the traffic would be from a WAN addressable device with its own assigned WAN address which could bypass NAT function 306.

Figure 4:
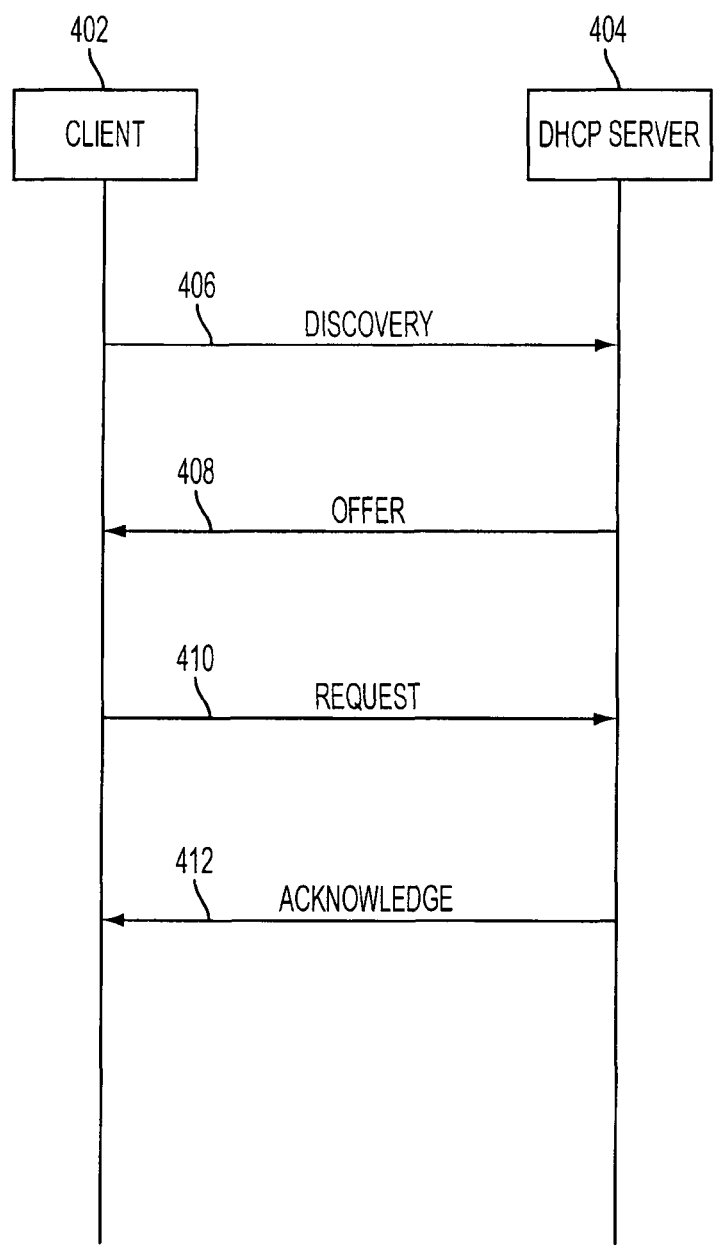
FIG. 4 shows dynamic host configuration protocol (DHCP) signaling messages.

For WAN addressed devices, e.g., cell phone 14 and PDA 16, the exemplary CPE GW 40 has the ability receive network access requests. Using exemplary systems and methods, the CPE GW 40 is capable of forwarding IP address requests from WAN addressable devices through a variety of methods as will be described in more detail below. Upon receiving a message(s) from cell phone 14, the router 302 and the DHCP decision function 304 determine if the received message is a DHCP message requesting an IP address from the WAN 22 side, i.e., if device 14 is a WAN addressable device. If so, then the CPE GW 40 forwards the DHCP message(s) to an IP edge node 26 on the WAN 22 side through the communications interface 308. An exemplary pattern for the initial DHCP messages can be described as shown in FIG. 4. Therein, a client 402 sends a DHCP Discovery message 406 to a DHCP server 404. The DHCP server 404 responds with a DHCP Offer message 408. The client 402 then responds with a DHCP Request message 410 which is then followed by the DHCP server 404 responding to the request with a DHCP Acknowledge message 412. More information regarding DHCP messages can be found in RFC 2131, which can be found at www.ietf.org and is incorporated herein by reference. Through the DHCP messaging process, a DHCP server 32 assigns an IP address for the requesting cell phone 14 and this IP address is then transmitted back to the CPE GW 40 which forwards this information to cell phone 14. While forwarding these DHCP messages between the DHCP server 32 and cell phone 14, the CPE GW 40 snoops address information from these DHCP messages. As a result of this snooping, the CPE GW 40 inserts a route entry locally into route entry table 310 for the given IP address for cell phone 14.

Regarding DHCP messages, when a device obtains its IP address, the device typically gets additional information from the DHCP signaling process. More specifically, the device receives information about the subnet to which it belongs, e.g., the device's subnet mask, and the address of the router acting on the subnet, in this case CPE GW 40. When a packet is sent within the subnet, ARP is used to get the MAC address and the packet is sent directly to the device with the associated MAC address. For packets sent to a destination outside of the subnet, the packet needs to be sent to the router 302 in CPE GW 40. However, if the MAC address of the router 302/CPE GW 40 is not known (or stored), ARP is used, using the IP address of the router received through DHCP to obtain the MAC address. For WAN addressable devices, this can cause a complication, because the IP edge 26 sends the DHCP Offer. In the DHCP Offer message, the IP edge includes its own IP address as the router address on the subnet. However, when the WAN addressable device desires to send a packet, it must find the MAC address of the CPE GW 40. This would normally lead the WAN addressed device to use ARP to attempt to find the MAC address which matches the IP address supplied by the IP edge 26. Since the ARP is only broadcasted on the LAN 30, there is no match to the supplied IP address, hence there is no device to answer the ARP message(s) and the transmission of packets would fail.

According to exemplary embodiments, the CPE GW 40 can perform a proxy-ARP process to address this issue as will now be described. When CPE GW 40 snoops the DHCP signaling, the CPE GW 40 obtains knowledge of the router IP address transmitted by IP edge 26. CPE GW 40 can use this snooped information to answer the ARP message(s) sent by the WAN addressed device on behalf of IP Edge 26, by responding with the MAC address of CPE GW 40. This results in packets being sent from the WAN addressed device going to the CPE GW 40, which can then forward the packets as described in other exemplary embodiments herein. Additionally, the CPE GW 40 can apply this technique for all addresses on the subnet to which the WAN addressable device belongs. Alternatively, the CPE GW 40 could replace the router address in the DHCP message(s), thus forcing the WAN addressable device to use it as the gateway.

Once the locally addressed devices and the WAN addressed devices have connected to LAN 30 and the CPE GW 40 has knowledge stored for uniquely identifying each device connected to the LAN 30, data packets can be transmitted between these devices. For example, to transmit IP packets from PC 10 with a locally assigned IP address of 192.168.0.1 to cell phone 14 with a WAN assigned IP address of 178.12.13.15, the IP packets go from PC 10 to CPE GW 40 which then forwards the IP packets to cell phone 14, thus keeping the information all locally routed within LAN 30. This occurs because the CPE GW 40 is aware of the IP address of cell phone 14 from the stored, snooped IP address associated with the cell phone's 14 earlier DHCP signaling session with the DHCP server 32 associated with WAN 22.

For transmitting IP packets from cell phone 14 to PC 10, a similar process occurs except that the PC's 10 default route for the subnet is known by the CPE GW 40 for communications. In the case where local multicast and broadcast traffic is occurring, e.g., for Universal Plug and Play (UPNP), the traffic is handled through local switching within the LAN 30. WAN addressed devices are also able to receive such traffic on local LAN 30. Also, for the WAN addressed devices, at some point the DHCP session typically ends, i.e., because the address lease expired or connectivity is lost due to mobility issues, and the earlier stored route entry in the route entry table 310 is then deleted. Until a new DHCP session occurs, the CPE GW 40 routes subsequent IP packets through the communications interface 308 on the WAN 22 side to the IP Edge 26.

As described above, there are various exemplary methods for CPE GW 40 to determine how to obtain a WAN IP address associated with WAN 22 for WAN addressed devices. According to one exemplary embodiment, every WAN addressed device in the household is associated with a virtual LAN (VLAN). In this context a VLAN can be considered to be a logical network with the endpoints being the CPE GW 40 and the WAN addressed device. So for the system shown in FIG. 3, the cell phone 14 would be associated with a first VLAN with the CPE GW 40 and the PDA 16 would be associated with a second VLAN with the CPE GW 40. The PCs 10 and 12 would be connected as described above. The identity associated with each VLAN would inform the CPE GW 40 that the received DHCP messages would need to go out to WAN 22 for IP address assignment. Also the identifying information associated with each VLAN (or the subsequently obtained WAN IP addresses) could be used for IP packet transfer between devices connected locally, e.g., PC 10 and cell phone 14. Alternatively, a single VLAN could be used for all of the devices desiring to obtain a WAN address.

According to another exemplary embodiment, the DHCP Discovery message can be modified to include a new option field to enable CPE GW 40 to obtain an IP address for WAN addressed devices. This new option field can include a flag for allowing a device, e.g., CPE GW 40, to know that a WAN addressed device in its network is requesting a WAN 22 IP address. Upon receiving this message the router 302 in conjunction with the DHCP decision field would see the new option field in the DHCP Discovery message and forward the message toward WAN 22 through the communications interface 308 with the end result being the return of an IP address which would be associated with the requesting device and stored in route entry table 310.

According to another exemplary embodiment, other means of uniquely identifying a device which desires a WAN address can be used for routing traffic locally in a LAN 30 as well as being used as a flag for CPE GW 40 to request a WAN address associated with WAN 30. For example, cell phone 14 can have a unique identifier, e.g., a media access control (MAC) address, which is known to the CPE GW 40. The CPE GW 40 could receive this unique identifier by an outside service provider or through some type of manual provisioning. Once the unique identifier is stored in the CPE GW 40, methods similar to those described above could be used for obtaining a WAN address when requested. Also similar methods for routing local traffic between locally addressed devices and WAN addressed devices on LAN 30 as described above can be used.

Figure 5:
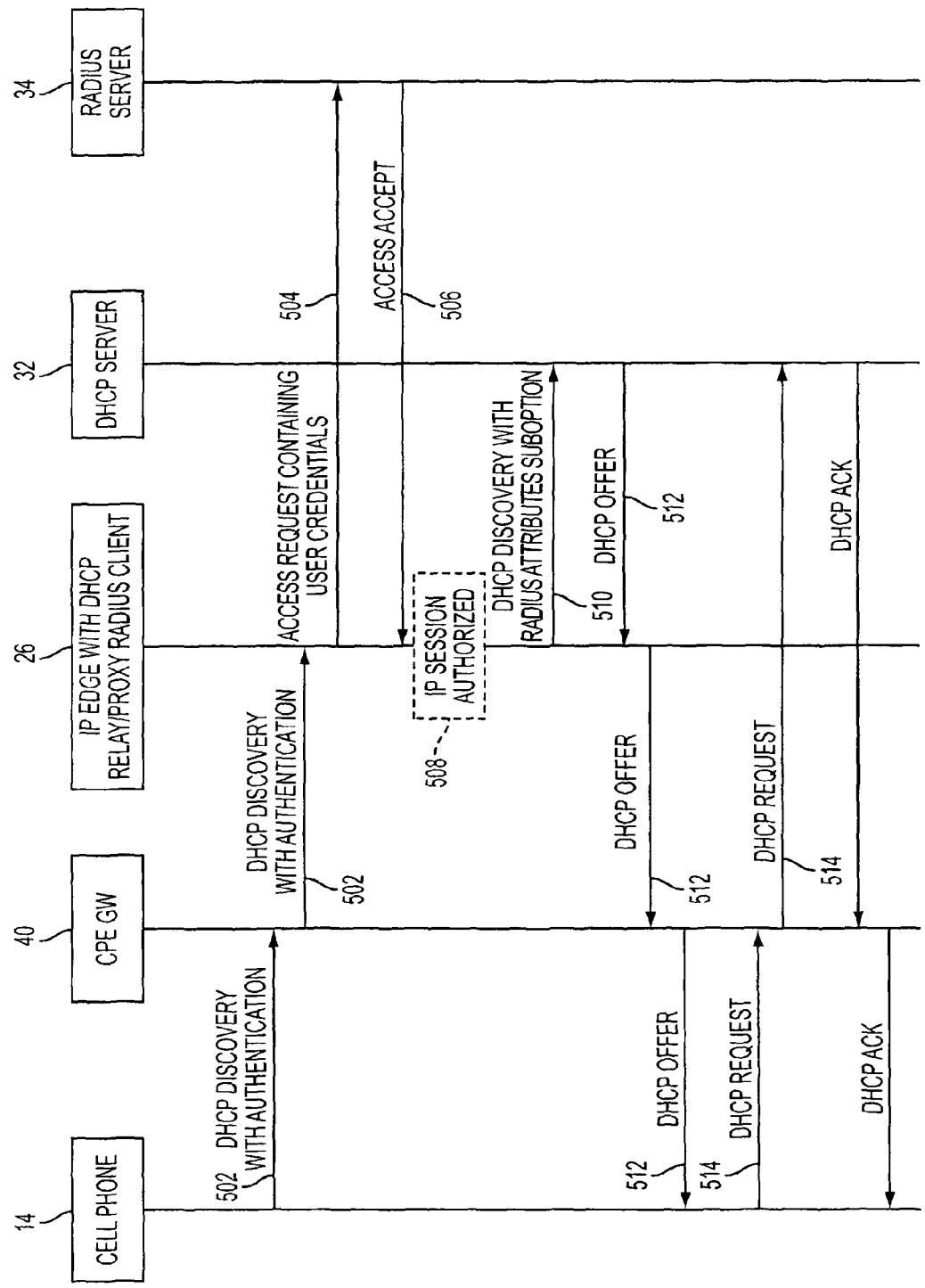
FIG. 5 depicts a call flow diagram using DHCP signaling through a CPE GW according to exemplary embodiments.

According to another exemplary embodiment, a WAN addressed device connecting through a CPE GW 40 can use a DHCP authentication process to obtain a WAN IP address. For example, using the exemplary call flow diagram shown in FIG. 5, a cell phone 14 desires a WAN 22 IP address and transmits a DHCP discovery with authentication message 502. The CPE GW 40 identifies that the cell phone 14 is using a DHCP based authentication and thereby knows that cell phone 14 wants to request a WAN 22 IP address. The CPE GW 40 forwards the DHCP discovery with authentication message 502 to the IP edge node 26 associated with the WAN 22. The IP edge node 26 then transmits an access request message 504 which includes user credentials associated with cell phone 14 contained within the DHCP discovery with authentication message 502 to RADIUS server 34. If the RADIUS server 34 accepts the request, the request is acknowledged in access accept message 506 and an IP session is authorized at 508. The IP edge node 26 then relays the DHCP discovery message (with RADIUS attributes as a sub-option) 510 to the DHCP server 32. DHCP server 32 assigns a WAN IP address to the cell phone 14 and transmits that offer back to the cell phone 14 (through the intervening nodes) as DHCP offer message 512. After receiving DHCP offer message 512, cell phone 14 then responds with a DHCP request message 514 which is forwarded by the CPE GW 40 to the DHCP server 32. The DHCP server 32 then completes this part of the process by transmitting a DHCP acknowledgement message 516 back to the cell phone 14 through CPE GW 40. During this exchange of DHCP messages, the CPE GW 40 snoops the IP address information as well as other pertinent information for entry into entry table 310. For more information regarding authentication of DHCP messages, the interested reader is directed to RFC 3118 which can be found at www.ietf.org and is incorporated herein by reference.

According to other exemplary embodiments, CPE GW 40 can include a firewall function for protecting the LAN 30. All traffic incoming from the WAN 22 side (or alternatively received communications from either side of the CPE GW 40) to the CPE GW 40 can be processed by the firewall function prior to being forwarded to the intended device. For example, traffic intended for WAN addressable device cell phone 14 would be received by CPE GW 40, processed by the firewall function, bypass the NAT function 306 and then be forwarded by router function 302 over the LAN 30 to cell phone 14.

Figure 6:
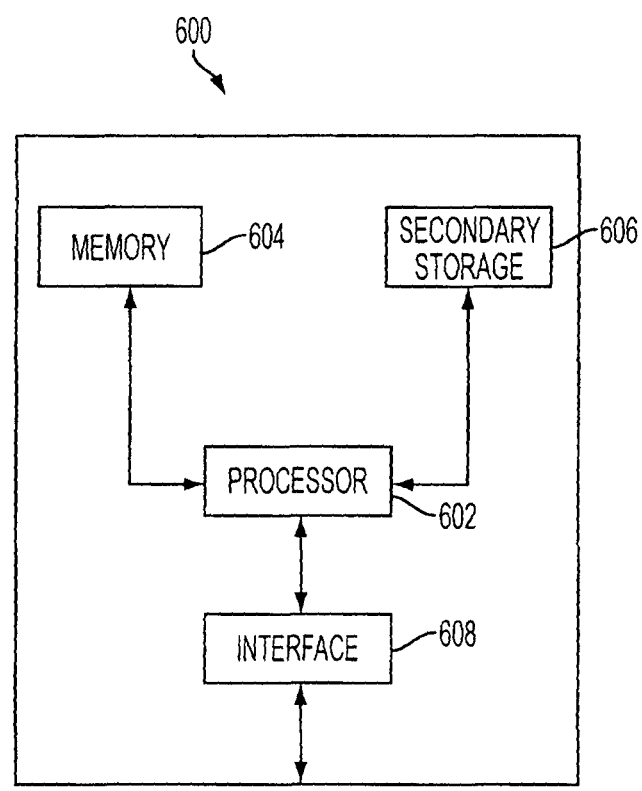
FIG. 6 shows a communications node according to exemplary embodiments.

The exemplary embodiments described above provide for messages and protocols involving access routers and other network nodes. An exemplary network node 600 will now be described with respect to FIG. 6. Network node 600 can contain a processor 602 (or multiple processor cores), memory 604, one or more secondary storage devices 606 and an interface unit 608 to facilitate communications between network node 600 and the rest of the network. The memory can be used for storage of exemplary items described above such as the IP addresses and other information relevant from the DHCP communications associated with the WAN addressed devices on a LAN. Thus, a network node according to an exemplary embodiment may include a processor for transmitting and receiving messages associated with at least forwarding communications between WAN addressed devices and locally addressed devices on the same LAN.

Figure 7:
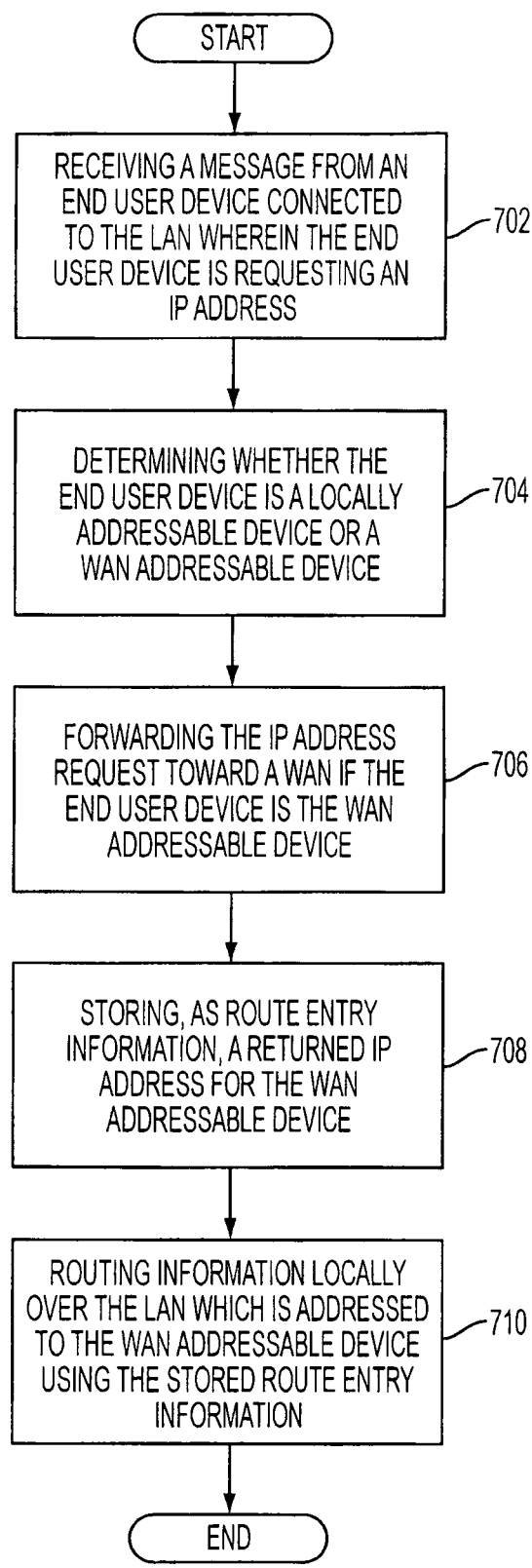
FIG. 7 illustrates a method flow chart according to exemplary embodiments.

Utilizing the above-described exemplary systems according to exemplary embodiments, a method for acquiring IP addresses for devices in a network is shown in the flowchart of FIG. 7. Initially a method for allowing both network devices desiring a local address and network devices desiring a wide area network (WAN) address to obtain Internet Protocol (IP) addresses via a local area network (LAN) includes: receiving a message from an end user device connected to the LAN wherein the end user device is requesting an IP address in step 702; determining whether the end user device is a locally addressable device or a WAN addressable device in step 704; forwarding the IP address request toward a WAN if the end user device is the WAN addressable device in step 706; storing, as route entry information, a returned IP address for the WAN addressable device in step 708; and routing information locally over the LAN which is addressed to the WAN addressable device using the stored route entry information in step 710.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for allowing both network devices desiring a local address and network devices desiring a wide area network (WAN) address to obtain Internet Protocol (IP) addresses via a local area network (LAN) comprising;
   receiving a message from an end user device connected to said LAN wherein said end user device is requesting an IP address;
   determining whether said end user device is a locally addressable device or a WAN addressable device;
   forwarding said IP address request toward a WAN when said end user device is said WAN addressable device;
   storing, as route entry information, a returned IP address for said WAN addressable device; and
   routing information locally over said LAN which is addressed to said WAN addressable device using said stored route entry information.

2. The method of claim 1, further comprising;
   receiving said returned IP address for said WAN addressable device from a dynamic host configuration protocol (DHCP) server and forwarding said IP address to said WAN addressable device.

3. The method of claim 1, further comprising;
   allocating an IP address locally and determining a default route for a subnet when said end user device is said locally addressable device.

4. The method of claim 1, wherein said WAN addressable device forms a virtual LAN with a customer premise equipment gateway and sends dynamic host configuration protocol (DHCP) messages over said virtual LAN.

5. The method of claim 1, wherein said received message is a modified DHCP Discover message which has an option field flagged for notifying a customer premise equipment gateway to request a WAN IP address for said WAN addressable device.

6. The method of claim 1, wherein said step of determining further comprises:
   providing unique identifying information for said WAN addressable device to a customer premise equipment gateway and using said unique identifying information to determine whether said end user device is a locally addressed device or a WAN addressed device.

7. The method of claim 1, wherein said step of forwarding said IP address request for said WAN addressable device further comprises:
   performing a dynamic host configuration protocol (DHCP) authentication process for said WAN addressable device.

8. The method of claim 1, further comprising:
   transmitting IP packets from a locally addressable end user device to said WAN addressable device by routing said IP packets through a customer premise equipment gateway associated with said LAN toward said WAN addressable device using said stored route entry information.

9. The method of claim 1, further comprising:
   transmitting IP packets from said WAN addressable device to a locally addressable device by routing said IP packets through a customer premise equipment gateway associated with said LAN toward said locally addressable device.

10. The method of claim 1, further comprising:
    ending a dynamic host configuration protocol (DHCP) session for said WAN addressable device and deleting said stored route entry information.

11. The method of claim 9, further comprising:
    routing subsequent IP packets through a wide area network (WAN) interface.

12. A communications node comprising:
   a router for receiving a message requesting an IP address;
   a dynamic host configuration protocol (DHCP) decision function for determining, at least in part, whether said request is associated with a locally addressable device or a WAN addressable device;
   a network access translation (NAT) function for allocating IP addresses locally for requests associated with said locally addressable device;
   a communications interface for forwarding IP address requests associated with said WAN addressable device; and
   a route entry information table for storing in said router, information used for routing IP packets transmitted from a locally addressable device to said WAN addressable device over said LAN.

13. The communications node of claim 12, wherein said communications node is a customer premise equipment gateway.

14. The communications node of claim 12, wherein said locally addressable device is capable of receiving and using a locally assigned IP address from said communications node.

15. The communications node of claim 12, wherein said WAN addressable device is not capable of being assigned a local IP address from said communications node and further wherein said WAN addressable device is capable of receiving and being assigned a forwarded WAN assigned IP address.

16. A method for allowing both network devices desiring a local address and network devices desiring a wide area network (WAN) address to obtain Internet Protocol (IP) addresses via a local area network (LAN) comprising:
   receiving a message from an end user device requesting an IP address;
   determining whether said at least one end user device is a locally addressable device or a WAN addressable device;
   selectively either allocating IP addresses locally when said end user device is said locally addressable device or forwarding an IP address request toward a WAN when said end user device is said WAN addressable device; and
   receiving a returned IP address for said WAN addressable device from a dynamic host configuration protocol (DHCP) server in the WAN and forwarding said IP address to said WAN addressable device.

* * * * *